United States Patent
Rusher et al.

(10) Patent No.: US 8,745,012 B2
(45) Date of Patent: Jun. 3, 2014

(54) LOG-STRUCTURED STORE FOR STREAMING DATA

(75) Inventors: Jack Rusher, New York, NY (US); Scott J. Kolodzieski, Chatham, NJ (US)

(73) Assignee: Sybase, Inc., Dublin, CA (US)

( * ) Notice: Subject to any disclaimer, the term of this patent is extended or adjusted under 35 U.S.C. 154(b) by 1026 days.

(21) Appl. No.: 12/188,665

(22) Filed: Aug. 8, 2008

(65) Prior Publication Data

US 2009/0063548 A1 Mar. 5, 2009

Related U.S. Application Data

(60) Provisional application No. 60/955,131, filed on Aug. 10, 2007.

(51) Int. Cl.
- *G06F 7/00* (2006.01)
- *G06F 17/00* (2006.01)
- *G06F 17/30* (2006.01)

(52) U.S. Cl.
CPC ............................... *G06F 17/30309* (2013.01)
USPC ........................... 707/695; 707/638; 707/806

(58) Field of Classification Search
USPC ........... 707/638, 714; 709/225, 218; 711/203; 718/1
See application file for complete search history.

(56) References Cited

U.S. PATENT DOCUMENTS

| | | |
|---|---|---|
| 5,204,958 A | 4/1993 | Cheng et al. |
| 5,664,160 A | 9/1997 | Fecteau et al. |
| 5,778,370 A | 7/1998 | Emerson |
| 5,794,229 A | 8/1998 | French et al. |
| 5,842,196 A | 11/1998 | Agarwal et al. |
| 5,873,097 A * | 2/1999 | Harris et al. ........................ 1/1 |
| 5,909,540 A | 6/1999 | Carter et al. |
| 5,918,225 A | 6/1999 | White et al. |
| 5,963,954 A | 10/1999 | Burrows |
| 5,996,054 A * | 11/1999 | Ledain et al. ................. 711/203 |
| 6,003,039 A | 12/1999 | Barry et al. |
| 6,006,225 A | 12/1999 | Bowman et al. |
| 6,006,230 A * | 12/1999 | Ludwig et al. ........................ 1/1 |
| 6,009,432 A | 12/1999 | Tarin |
| 6,014,670 A | 1/2000 | Zamanian et al. |
| 6,029,170 A | 2/2000 | Garger et al. |
| 6,035,306 A | 3/2000 | Lowenthal et al. |
| 6,044,374 A | 3/2000 | Nesamoney et al. |
| 6,070,158 A | 5/2000 | Kirsch et al. |
| 6,073,134 A | 6/2000 | Shoup et al. |
| 6,073,140 A | 6/2000 | Morgan et al. |
| 6,078,918 A | 6/2000 | Allen et al. |
| 6,108,647 A | 8/2000 | Poosala et al. |
| 6,108,659 A | 8/2000 | Vincent |
| 6,119,128 A | 9/2000 | Courter et al. |

(Continued)

OTHER PUBLICATIONS

Blakeley, et al., "Efficiently Updating Materialized Views," Proc. of SIGMOD, Washington. 1986, 11 pages.

(Continued)

*Primary Examiner* — Susan Chen
(74) *Attorney, Agent, or Firm* — Sterne, Kessler, Goldstein & Fox P.L.L.C.

(57) ABSTRACT

An event stream processing system includes a versioned data structure layered over a log-structured store. A first address handle points to a first version of data in the versioned data structure. A stream of data updates from a data source create a second version of data in the versioned data structure, addressed using a second address handle.

29 Claims, 3 Drawing Sheets

(56) References Cited

U.S. PATENT DOCUMENTS

| | | | |
|---|---|---|---|
| 6,161,103 | A | 12/2000 | Rauer et al. |
| 6,189,004 | B1 | 2/2001 | Rassen et al. |
| 6,230,166 | B1 | 5/2001 | Velamuri et al. |
| 6,286,005 | B1 | 9/2001 | Cannon |
| 6,341,288 | B1 | 1/2002 | Yach et al. |
| 6,377,948 | B2 | 4/2002 | Kikuchi et al. |
| 6,377,953 | B1 | 4/2002 | Gawlick et al. |
| 6,377,958 | B1 | 4/2002 | Orcutt |
| 6,405,187 | B1 | 6/2002 | Egan et al. |
| 6,405,208 | B1 | 6/2002 | Raghavan et al. |
| 6,408,292 | B1 | 6/2002 | Bakalash et al. |
| 6,411,950 | B1 | 6/2002 | Moricz et al. |
| 6,418,450 | B2 | 7/2002 | Daudenarde |
| 6,434,544 | B1 | 8/2002 | Bakalash et al. |
| 6,513,041 | B2 | 1/2003 | Tarin |
| 6,574,637 | B1 * | 6/2003 | Lindsey .................. 707/714 |
| 6,633,883 | B2 | 10/2003 | Koskas |
| 6,694,325 | B2 | 2/2004 | Jas |
| 6,704,739 | B2 | 3/2004 | Craft et al. |
| 6,832,229 | B2 | 12/2004 | Reed |
| 6,839,714 | B2 | 1/2005 | Wheeler et al. |
| 6,839,759 | B2 | 1/2005 | Larson et al. |
| 6,880,007 | B1 * | 4/2005 | Gardos et al. ............ 709/225 |
| 6,950,834 | B2 | 9/2005 | Huras et al. |
| 6,954,757 | B2 | 10/2005 | Zargham et al. |
| 6,993,504 | B1 | 1/2006 | Friesen et al. |
| 7,007,049 | B2 * | 2/2006 | Peng ........................... 1/1 |
| 7,031,974 | B1 | 4/2006 | Subramaniam |
| 7,130,853 | B2 | 10/2006 | Roller et al. |
| 7,246,093 | B1 | 7/2007 | Katz |
| 7,305,421 | B2 | 12/2007 | Cha et al. |
| 7,324,955 | B1 | 1/2008 | Ford et al. |
| 7,363,353 | B2 * | 4/2008 | Ganesan et al. ........... 709/218 |
| 7,716,182 | B2 * | 5/2010 | Tewksbary ................ 707/638 |
| 8,069,106 | B2 | 11/2011 | Waelbroeck et al. |
| 8,219,569 | B2 | 7/2012 | Idicula et al. |
| 2002/0029207 | A1 | 3/2002 | Bakalash et al. |
| 2003/0009411 | A1 | 1/2003 | Ram et al. |
| 2003/0078987 | A1 | 4/2003 | Serebrennikov |
| 2003/0217033 | A1 * | 11/2003 | Sandler et al. ............... 707/1 |
| 2005/0071359 | A1 | 3/2005 | Elandassery et al. |
| 2006/0059065 | A1 | 3/2006 | Glinberg et al. |
| 2007/0203925 | A1 | 8/2007 | Sandler et al. |
| 2008/0086401 | A1 | 4/2008 | Mather |
| 2008/0115079 | A1 | 5/2008 | Mather |
| 2008/0134178 | A1 * | 6/2008 | Fitzgerald et al. ............ 718/1 |
| 2008/0168109 | A1 | 7/2008 | Gaurav et al. |
| 2008/0288329 | A1 | 11/2008 | Nannis et al. |
| 2009/0037769 | A1 | 2/2009 | Babkin et al. |
| 2009/0076978 | A1 | 3/2009 | Dayan |
| 2009/0259598 | A1 | 10/2009 | Stevens et al. |

OTHER PUBLICATIONS

Blakeley, et al., "Updating Derived Relations: Detecting Irrelevant and Autonomously Computable Updates," ACM Transactions on Database Systems, vol. 14, No. 3, Sep. 1989, 34 pages.

Gupta, et al., "Maintaining Views Incrementally," ACM SIGMOD Conference, Washington. D.C., May 1993, 10 pages.

Griffin. et al., "Incremental Maintenance of Views with Duplicates," Proc. of SIGMOD, 1995, 12 pages.

Quass, "Maintenance Expressions for Views with Aggregation," Proc. of SIGMOD, 1996, Workshop on Materialized Views, 9 pages.

Vista, "Optimizing Incremental View Maintenance Expressions in Relational Databases," 1996, 145 pages.

Zhao, et al., "On the Performance of an Array-Based ADT for OLAP Workloads," Aug. 29, 1996, 20 pages.

Zhao, et al., "Array-Based Evaluation of Multi-Dimensional Queries in Object-Relational Database Systems," Feb. 21, 1997, 18 pages.

"Warehouse Administrator's Guide for UNIX Platforms," Red Brick Warehouse, Version 5.1, Chapter 3, "Schema Design," Red Brick, Jan. 1998, 28 pages.

Dennis Shasha, "Time Series in Finance: the array database approach," VLDB Conference, Aug. 1998, 23 pages.

Zhao, et al., "Simultaneous Optimization and Evaluation of Multiple Dimensional Queries," Proc. ACM-SIGMOD, 1998, 10 pages.

Berry, et al., "Matrices, Vector Spaces, and Information Retrieval," SIAM Review, Apr. 23, 1999, vol. 41, No. 2, pp. 335-362.

"Multi-Dimensional Databases and Online Analytical Processing," Slide Presentation, 1999, 32 pages.

"Informix Red Brick Decision Server," Informix, Version 6.10, Technical Brief, 2000, 4 pages.

Sand Technology Library, "Nucleus Server White Paper," 2001, pp. 1-10.

Oracle, "Oracle9i Materialized Views," An Oracle White Paper, May 2001, 23 pages.

Purcell, et al., "Evolution of Star join Optimization," DB2 Universal Database for z/OS and OS/390, White Paper, Oct. 2001, 20 pages.

"Column-Based Analytical Technology: The Missing Piece of the Data Analytics Puzzle," Alterian, Oct. 2001, 19 pages.

"Nucleus Proves Itself a Super-Scalable iSeries Solution at the Teraplex," International Business Machines Corporation, 2001, 4 pages.

"Nucleus Executive Overview," Sand Technology, 2001, 4 pages.

"SAS/Warehouse Administrator 2.2 offers meta-driven automation," SAS Institute Inc., 2001, www.sas.com.

"Project Proposal: Vector database engine," 2002.

"The IDUG Solutions Journal," Solutions Journal, vol. 9, No. 1, Mar. 2002, 8 pages.

Duval, et al., "Metadata Principles and Practicalities," D-Lib Magazine, vol. 8, No. 4, Apr. 2002, 11 pages.

Howard, "Aleri—An Evaluation by Bloor Research," Bloor Research, May 2, 2002, 7 pages.

Stata, et al., "The Term Vector Database: fast access to indexing terms for Web pages," Proc. of the 9th International World Wide Web Conference, Amsterdam, Netherlands, May 2002, 9 pages.

"Red Brick Warehouse," IBM Software, Downloaded from Web, Aug. 2002.

"Anglo Irish Bank," Decision Works Case Study, Decision Works, Downloaded from Web, Aug. 2002.

"Innovations in data warehousing—Answering Complex, Real-Time and Dynamic Queries," Bloor Research, Aug. 2002.

"RODIN Data Warehousing," Downloaded from Web, Aug. 2002, 12 pages.

Palpanas, et al., "Incremental Maintenance for Non-Distributive Aggregate Functions," Proc. of VLDB Conference Hong Kong, Aug. 2002, 12 pages.

International Search Report for PCT/US03/15273 dated Jul. 10, 2003, 4 pages.

Chaudhuri, S. et al, "An overview of data warehousing and OLAP technology," SIGMOD Record, ACM, New York, NY, US, vol. 26, No. 1, Mar. 1997, 10 pages.

Page, Christopher R., "Configuring Database Systems," Proceedings of the Twelfth Systems Administration Conference (LISA '98), Boston, Massachusetts, Dec. 6-11, 1998, 13 pages.

Morzy, Tadeusz et al., "Optimizing Pattern queries for Web Access Logs," Springer Berlin/Heidelberg, vol. 2151, 2001, pp. 141-154.

Supplementary European Search Report for Application No. EP 03728933.7, date of completion Jan. 28, 2008, 3 pages.

Baulier, et al., "A Database System for Real-Time Event Aggregation in Telecommunication", Proceedings of the 24th VLDB Conference, pp. 680-684.

Baulier, et al., "DataBlitz Storage Manager: Main-Memory Database Performance for Critical Applications," Bell Laboratories, Murray Hill, ACM 1999, pp. 519-520.

Cranor, et al., "Gigascope: High Performance Network Monitoring with an SQL Interface", SIGMOD 2002, Jun. 3-6, 2002, p. 623.

Jagadish, et al., "Dali: A High Performance Main Memory Storage Manager", AT&T Bell Labs., Proceedings of the 20th VLDB Conference, Santiago, Chile, 1994, pp. 48-59.

Luckham, et al., "Complex Event Processing in Distributed Systems", Aug. 18, 1998, pp. 1-28.

Luckham, et al., "Specification and Analysis of System Architecture Using Rapide", IEEE Transactions on Software Engineering, vol. 21; No. 4, Apr. 1995, pp. 336-355.

(56) References Cited

OTHER PUBLICATIONS

Olson, et al., "Berkeley DB", Published in the Proceedings of the FREENIX Track: 1999 USENIX Annual Technical Conference, Jun. 6-11, 1999, 10 pages.

Ousterhout, et al., "Beating the I/O Bottleneck: A Case for Log-Structured File Systems", Oct. 30, 1988, pp. 11-28.

Rosenblum, et al., "The LFS Storage Manager", USENIX Summer Conference, Jun. 11-15, 1990, Anaheim, California, pp. 315-324.

Seltzer, et al., "An Implementation of a Log-Structured File System for UNIX", 1993 Winter USENIX, Jan. 25-29, 1993, San Diego, CA, pp. 307-326.

Seltzer, et al., "File System Logging Versus Clustering: A Performance Comparison", 1995 USENIX Technical Conference, Jan. 16-20, 1995, New Orleans, LA, pp. 249-264.

Snodgrass, et al., "A Taxonomy of Time in Databases", 1985 ACM, Mar. 1985, pp. 236-246.

Stonebraker, Michael, "The Design of the Postgres Storage System", Proceedings of the 13th VLDB Conference, Brighton 1987, pp. 289-300.

Varman, et al., "An Efficient Mutilversion Access Structure", IEEE Transactions on Knowledge and Data Engineering, vol. 9, No. 3, May/Jun. 1997,pp. 391-409.

International Search Report for PCT/US2009/040332 dated Jun. 19, 2009, 2 pages.

Final Office Action mailed Jul. 12, 2006, in U.S. Appl. No. 10/150,763, Sandler et al., filed May 17, 2002, 11 pages.

Non-Final Office Action mailed Oct. 14, 2006, in U.S. Appl. No. 10/150,763, Sandler et al., filed May 17, 2002, 7 pages.

Notice of Allowance mailed Nov. 7, 2006, in U.S. Appl. No. 10/150,763, Sandler et al., filed May 17, 2002, 9 pages.

Non-Final Office Action mailed Nov. 14, 2007, in U.S. Appl. No. 11/653,766, Sandler et al., filed Jan. 16, 2007, 6 pages.

Final Office Action mailed Jul. 18, 2008, in U.S. Appl. No. 11/653,766, Sandler et al., filed Jan. 16, 2007, 9 pages.

Non-Final Office Action mailed Oct. 6, 2010, in U.S. Appl. No. 12/140,345, Babkin et al., filed Jun. 17, 2008, 11 pages.

Final Office Action mailed Jun. 21, 2011, in U.S. Appl. No. 12/140,345, Babkin et al., filed Jun. 17, 2008, 12 pages.

Non-Final Office Action mailed Jun. 13, 2013, in U.S. Appl. No. 12/140,345, Babkin et al., filed Jun. 17, 2008, 13 pages.

Final Office Action mailed Nov. 14, 2013, in U.S. Appl. No. 12/140,345, Babkin et al., filed Jun. 17, 2008, 14 pages.

Non-Final Office Action mailed Mar. 18, 2011, in U.S. Appl. No. 12/422,050, Stevens et al., filed Apr. 10, 2009, 10 pages.

Final Office Action mailed Sep. 19, 2011, in U.S. Appl. No. 12/422,050, Stevens et al., filed Apr. 10, 2009, 12 pages.

\* cited by examiner

US 8,745,012 B2

LOG-STRUCTURED STORE FOR STREAMING DATA

CROSS-REFERENCE TO RELATED APPLICATIONS

This application claims the benefit of and priority to U.S. Provisional Application Ser. No. 60/955,131, filed Aug. 10, 2007, the disclosure of which is hereby incorporated by reference in its entirety.

FIELD OF THE INVENTION

Embodiments of the invention relate to computer-based data processing, and, more particularly, to event stream processing systems.

BACKGROUND OF THE INVENTION

Event stream processing (ESP) systems are used to process, store, and retrieve data streams having that require high transactional throughput rates. ESP systems have typically focused on in-memory databases to achieve high performance, but there are several classes of ESP systems for which in-memory databases are not well suited. Some systems require, for example, the persistence of some subset of the events processed and/or results that are produced at very high data rates, a feature which in-memory databases cannot provide. A persistent storage device, such as a hard disk, may be used to provide these features, and, indeed, some other classes of systems, such as event pattern matching and situation detection systems, do make use of persistent storage. Most high-performance ESP systems, however, are unable to tolerate the latency and degradation of throughput that results when data is stored to disk. Consequently, conventional ESP systems use techniques such as chronicling, estimation, and/or load-shedding, to store short-lived data using in-memory databases or custom indices to boost performance.

Log-structured stores (LSS) may also be used to increase the throughput of an ESP system. A conventional storage system is typically organized into a read-optimized repository with a write-optimized journal as a front-end to absorb the high volume of incoming transactions (for long lived data), coupled with a batch update mechanism for writing to the read-optimized repository. An LSS, in contrast, uses a log file that is constructed from a write-optimized journal, and appends data to the tail of the log. Although LSSs were initially thought to be a promising solution for write-intensive applications such as ESP systems, performance is hindered by the need for a background garbage collector or "cleaner" to reclaim free space from the log file. As a result, performance of the system degrades as the ratio of live data to free space increases because more and more time is spent waiting for the cleaner to re-locate live data while reclaiming very little free space.

SUMMARY OF THE INVENTION

In view of the foregoing, there is a need for techniques and supporting systems that provide high-speed, persistent storage for high-throughput streaming data processing systems. The present invention, in various embodiments, provides a persistent storage system with performance on the order of purely in-memory systems. A versioned data structure may be layered over a log-structured store to provide snapshot versioning, which, even with the frequently re-written nature of incoming streaming data, allows the log-structured store to write and re-write data primarily at the tail or write-point of the store. Moreover, implementing the log-structured store with 64-bit addressing allows the versioned data structure to store file offsets within the store, and mapping the log-structured store to memory addresses may allow the underlying operating system to cache the store in virtual memory.

In general, and in one aspect, a method for streaming data to a log-structured store in an event stream processing system includes creating a versioned data structure (e.g., a binary or AVL tree) which is layered over the log-structured store. A first version of data in the versioned data structure has a first address handle. A stream of data updates is received from a data source, and a second version of the data is created by adding the data updates to the versioned data structure. The second version of the data is addressable by a second address handle while first version of the data remains addressable by the first address handle. The first version of the data is subsequently removed when no longer needed or space constraints dictate removal.

In various embodiments, the method includes presenting data addressed by the first address handle in response to a read request, wherein the read request overlaps in time with a data update to data addressed by the second address handle. In some implementations, the log-structured store may be addressed using file offsets contained in the versioned data structure. A portion (or in some cases all) of the log-structured store may be memory mapped, and at least part of the memory-mapped log-structured store can be stored in virtual memory. The memory-mapped log-structured store may be addressed using 64-bit addressing.

In some embodiments, index lookups may be performed against the memory-mapped log-structured store, thus preventing disk head movement away from a tail of a backing file for the log-structured store. Space may be cleared in the log-structured store by re-writing live data at a write point, and the cleared space may be used to re-pack new data into related nodes of the data store. In some implementations, the log-structured store may be restricted to be bounded by physical memory. The versioned data structure may be updated with a single data update or with a change-set comprising a plurality of data updates. The plurality of data updates comprises data updates corresponding to a multi-event transaction.

In general, and in another aspect, an event stream processing system for storing and accessing streaming data includes a storage device and an update module. The storage device includes a log-structured store, and a versioned data structure layered over the log-structured store having a first version of the data stored in the versioned data structure. The versioned data structure may be a binary tree or an AVL tree. The update module is configured to receive data updates from a source of streaming data (e.g., an upstream data processing application) and update the versioned data structure with the data updates, thus creating a second version of the data. The update module is further configured such that the first and second versions of data are separately addressable, and to remove the first version of the data when (and in some cases if) need be.

In various embodiments, the versioned data structure is addressable with memory mapped file offsets such as 64-bit offsets. The event stream processing system may further include a cache for holding data, which may, in some embodiments, be a virtual memory subsystem of an operating system.

In certain instances, the update module updates the versioned data structure using a change-set that comprises data updates, including data updates corresponding to a multi-event transaction. In some embodiments, a garbage collection module is configured to re-write live data at a write point, thereby clearing space in the log-structured store. In such cases, the update module can use the cleared space to re-pack new data into related nodes of the data structure. Furthermore, a read module may be configured to respond to a read request, wherein the read request overlaps in time with a data update.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

BRIEF DESCRIPTION OF THE DRAWINGS

The foregoing and other objects, aspects, features, and advantages of embodiments of the invention will become more apparent and may be better understood by referring to the following description taken in conjunction with the accompanying drawings, in which.

DESCRIPTION OF THE INVENTION

In various embodiments, the present invention pertains to systems and methods for using a log-structured store for processing, capturing and storing streaming data. In broad overview, and in accordance with one embodiment of the invention, a versioned data structure is layered over the log-structured store, and a first address handle is created for a first version of data in the versioned data structure. As updates are received from a source (or sources) of streaming data, the updates are added to the versioned data structure, creating a second version of the versioned data structure. A second address handle may then be created to address the new version of the data. In some instances, the first version may remain addressable by using the first address handle as the second version is addresses using the second address handle. After a specified time, the first version of the data may be removed.

Figure 1:
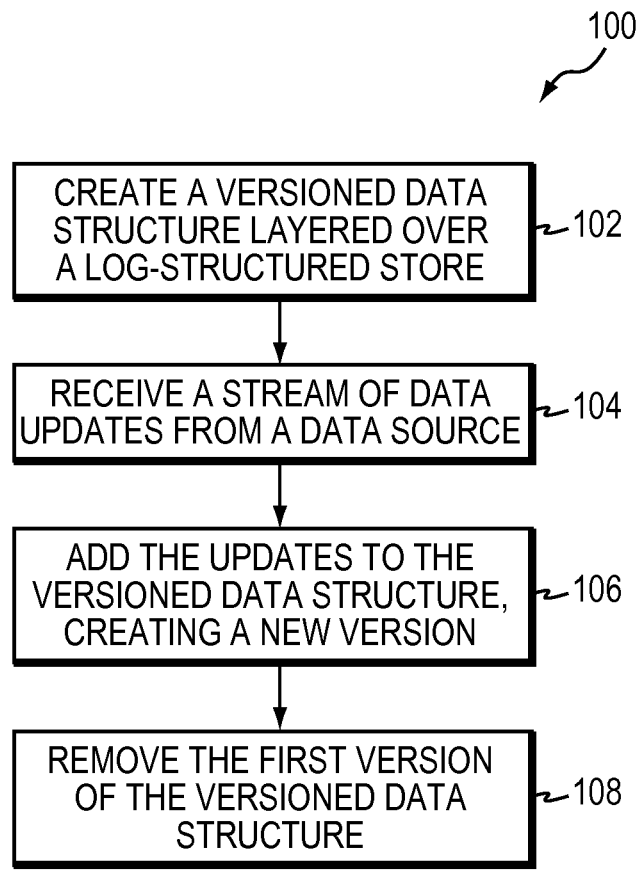
FIG. 1 depicts a flow diagram of an illustrative approach to using a log-structured store with an event stream processing system.

FIG. 1 depicts a flow diagram of an illustrative approach 100 to using a log-structured store with an event stream processing system. Briefly, the approach includes creating a versioned data structure layered over a log-structured store (step 102), receiving a stream of data updates from a data source (step 104), adding the updates to the versioned data structure thereby creating a new version (step 106), and removing the first version of the versioned data structure (step 108).

In greater detail, with reference to step 102, a versioned data structure may be created and layered over the log-structured store. Read and/or write operations directed to the log-structured store may send the read/write requests to the versioned data structure, which may then control the sending of the request to the log-structured store.

As explained further below, the versioned data structure may be a binary tree, such as an AVL tree or other similar structure. A first address handle may be used to reference a first version of the data stored in the versioned data structure. For example, if the versioned data structure is a tree, the first address handle may point to a root node of the tree. The versioned data structure may be capable of maintaining any number of previous versions of the data. In one embodiment, the versioned data structure maintains only one current version of the data; in another embodiment, the versioned data structure may maintain as many prior versions of the data as its capacity allows. In an alternative embodiment, the versioned data structure may maintain a previous version of the data for a limited period of time.

At least part of the underlying log-structured store may be mapped into local memory to improve input/output performance of read and/or write operations. If, in some cases, the log-structured store is larger than the space allocated in local memory, part of the store may be moved to virtual memory by the underlying operating system. This approach may permit caching of the log-structured store with little bookkeeping overhead, no double buffering, and no calls to memory allocator functions, such as C/C++'s malloc( ) function. Addressing the log-structured store with 64-bit addressing provides one method of implementing file-local object identifiers (OIDs) as 64-bit offsets.

The event stream processing system receives a stream of data updates (step 104) from as upstream applications and/or other systems generate data transactions. The data source may be, for example, a telecommunications system sending data updates in the form of streams of data representing call data records or network packet traffic. In general, the data source may be any source of high-throughput streaming data.

Referring to the third step 106, in greater detail, an update module adds data updates to the versioned data structure, creating a new version of the data. Maintaining the new version and the previous version of the data avoids read/write lock contention on the storage system. For example, while an update is being written to a location in the versioned data structure, the system is configured such that reads are permitted from the same location by writing to the new version and reading from the previous version.

In some embodiments, a single data update in the versioned data structure may be committed to the data store. In other embodiments, it may be more efficient to create a change set containing numerous data updates caused by a group of events and commit the change set to the data store in batch. Batch changes become more efficient when, for example, as the ratio of data to metadata in a given commit increases and more nodes of the tree are modified. The batch changes may also be used to support multi-event transactions.

Referring to the fourth step 108, the first version of the data may be removed from both the versioned data structure and from the underlying log-structured store. In one embodiment, the first version of the data is maintained as a temporary "snapshot" of the data, and remains present only as long as it is needed. The duration that the first version is maintained may remain consistent, or, in some instances, be modified based on the contents of the data store. For example, if the first version of the data has been replaced with the second version of the data, and there are no remaining pending read requests requiring the first version of the data, the system may safely remove the first version. In another embodiment, the first version of the data may retained by a time defined by a window over some ordering property of the data updates. In an alternative embodiment, the first version of the data is maintained for a specified amount of time, such as a time dependent on the latency of the underlying log-structured store and/or the duration of a write.

Previous versions of the data may be removed by a garbage collection or "cleaning" function. The cleaning function may re-write live data at the write-point (i.e., the tail) of the log-structured store in order to clear space for continued writing. This approach also allows the data to be "re-packed" into clusters of related tree nodes to improve data locality, and as a result, overall system performance. For example, the cleaning function may delete a first version of a particular node after a data update writes a second version of data to the node, and, later, another data update to the same node may write a third version of data to the physical location formerly occupied by the first version.

In the event of a system failure, or other event that disrupts the event stream processing system, it may be necessary to examine uncommitted data updates or writes, and either replay or reject them in order to process the transactions. In one embodiment, a roll-forward recovery method is used. The roll-forward recovery may include a superblock-style one-page header with a clean bit.

Figure 2:
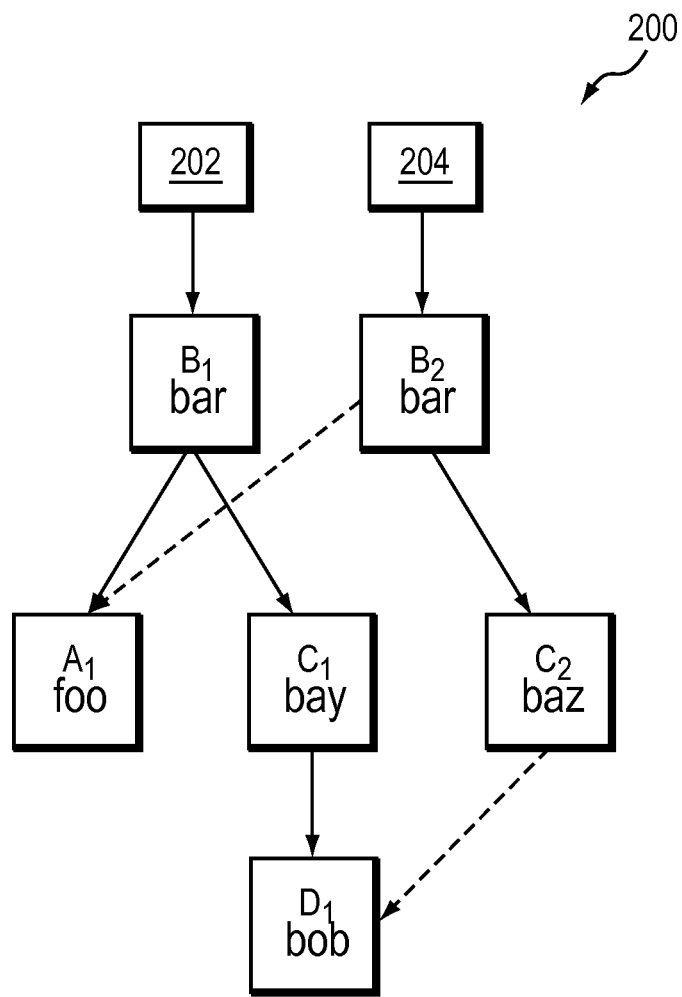
FIG. 2 illustrates an example of a versioned tree data structure in accordance with one embodiment of the invention.

FIG. 2 shows one embodiment of the versioned data structure implemented as a binary tree 200. The tree 200 holds keys A, B, C, and D, representing the values "foo," "bar," "bay," and "bob," respectively. A first address handle 202 points to a first version of the keys, represented by nodes $A_1$, $B_1$, $C_1$, and $D_1$, of which node $B_1$ is a root node. As the result of a data update, the value of key C is changed from "bay" to "baz." The node $C_1$ is left unchanged, however, and a new node $C_2$ is created to hold the new value "baz." As a result, the rest of the tree 200 is modified to accommodate the new node $C_2$. First, node $C_2$ is modified to point to any children of node $C_1$ (here, node $D_1$). Next, the parent of node $C_1$ (here, node $B_1$) is copied (here, to node $B_2$), and the copied parent node $B_2$ is modified to point to the new child node $C_2$ and to the unmodified child of the former parent node $B_1$, if it exists (here, node $A_1$). Further parents of node $C_1$, if any, are also copied until a root of the tree 200 is reached. A new address handle 204 is created to point to the new root (here, node $B_2$).

The new address handle 204 thus points to a version of the tree 200 as it exists after the data of key C was updated, while the old address handle 202 points to a version of the tree 200 as it existed before the data update. With such an implementation of a versioned data structure, a write request to key C need not lock out a simultaneous read request to key C, because, for example, the write request may create the new version referenced by handle 204 while the read request accesses the version of the tree referenced by handle 202. The old address handle 202 and the version of the tree 200 to which it points may be deleted when they are no longer needed.

Figure 3:
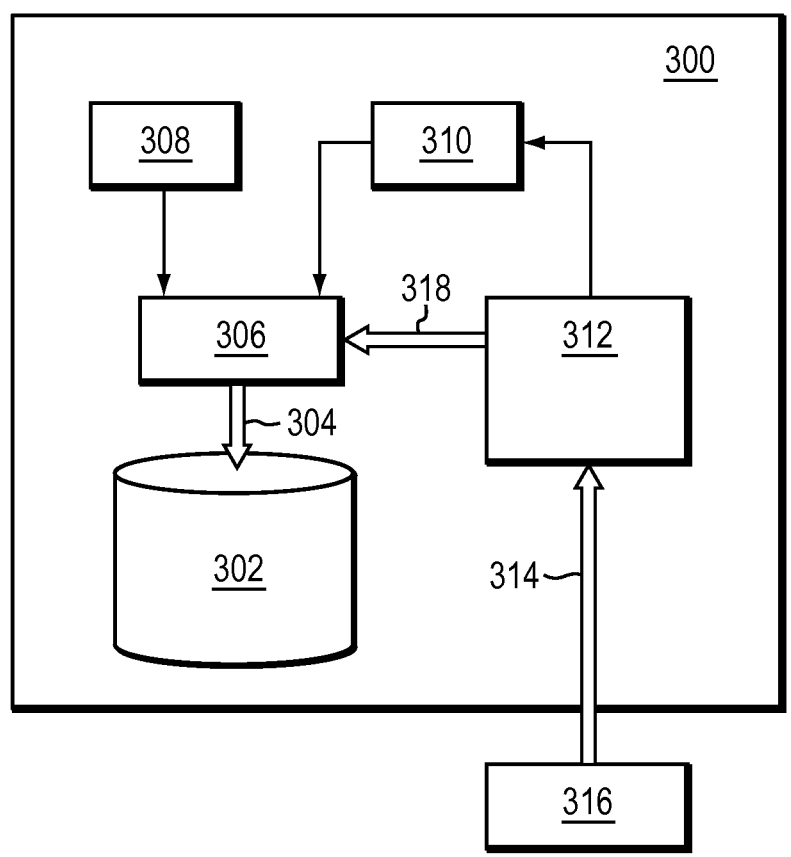
FIG. 3 illustrates a conceptual block diagram of a log-structured store for capturing streaming data in accordance with one embodiment of the invention.

FIG. 3 illustrates a conceptual block diagram 300 of an event stream processing system that includes a log-structured store 302 for capturing streaming data in accordance with one embodiment of the invention. In this instance, the log-structured store 302 is configured for persistent storage of incoming storage data 304, and may include any suitable magnetic, optical, or solid-state storage medium, such as, for example, a hard disk drive. The addition of incoming data 304 may be limited to the tail of a backing file in the log-structured store 302, thereby eliminating the need for the store 302 to write each unit of incoming data 304 to different locations throughout the storage medium and incur the associated seek time delay associated with, e.g., moving a disk head. Some or all of a backing file in the log-structured store 302 may be memory mapped to non-persistent local storage, such as local memory.

A versioned data structure 306 may be layered over the log-structured store. The versioned data structure 306 may contain one or more versions of a data set, each version corresponding to a different data update or group of data updates. In such cases, each data set version is separately addressable. For example, in one such case, a first address handle 308 points to a first version of the data in the versioned data structure, and a second address handle 310 points to a second version. The two handles 308, 310 and versions may exist, and therefore be accessible, at the same time. Portions of the versioned data structure 306 may reside on the log-structured store 302 or in non-persistent local storage, such as local memory.

An update module 312 receives data updates 314 from one or more sources of streaming data 316. The update module 312 processes the data updates, and configures the versioned data structure 306 to accept the processed updates 318. The update module 312 creates a new file handle 310 to correspond to the updates 318, such that the file handle 310 points to a new version of the data in the versioned data structure 306.

Although the data updates 304, 318, 316 illustrate the flow of streaming data as it is written to the log-structured store 302, similar mechanisms exist for reading data from the log-structured store 302.

Compared to custom in-memory indexing structures such as red-black trees and hashes and based on actual implementations, various embodiments of the invention perform at 46.50% of a tuned in-memory hash table on raw record insertion for a sixteen million record test run, and perform at 58.22% of an in-memory red-black tree for a four million record test run of a more computationally demanding application, such as one involving a group of simultaneous Value Weighted Average Price (VWAP) calculations. As a comparison, similar experiments with other read-optimized embeddable databases, such as the Berkeley DB, provided approximately 10% of the performance of in-memory indexing structures, roughly one-fifth that of embodiments of the present invention.

The log-structured store 302, versioned data system 306, and update module 312 may each be implemented as any software program and/or hardware device, for example as an application specific integrated circuit (ASIC) or field programmable gate array (FPGA), that is capable of providing the functionality described above. In addition, it will be understood by one having ordinary skill in the art that the illustrated modules 302, 306, and 312 are conceptual, rather than explicit, requirements. For example, two or more of the modules 302, 306, and 312 may be combined into a single module, such that the functions performed by the two or more modules, as described above, are in fact performed by the single module. In addition, it will be understood that any single one of the modules 302, 306, and 312 may be implemented as multiple modules, such that the functions performed by any single one of the modules 302, 306, and 312 as described above, are in fact performed by the multiple modules.

Moreover, the event stream processing system 300 may be modified in of a variety of manners without departing from the spirit and scope of embodiments of the invention. For example, rather than being implemented on a single system, any one or all of the modules 302, 306, and 312 may be implemented on one or more other computing devices (not shown) and communicate with the each other directly or over a network (not shown). As such, the depiction of the system 300 in FIG. 3 is non-limiting.

It should also be noted that embodiments of the present invention may be provided as one or more computer-readable programs embodied on or in one or more articles of manufacture. The article of manufacture may be a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Many alterations and modifications may be made by those having ordinary skill in the art without departing from the spirit and scope of embodiments of the invention. Therefore, it must be expressly understood that the illustrated embodiments has been shown only for the purposes of example and should not be taken as limiting the embodiments. The disclosure should therefore be read to include all equivalent elements for performing substantially the same function in substantially the same way to obtain substantially the same result, even though not identical in other respects to what is shown and described in the above illustrations.

What is claimed is:

1. A method for streaming data to a log-structured store in an event stream processing system, the method comprising:
   creating a versioned data structure layered over the log-structured store, a first version of data in the versioned data structure having a first address handle;
   receiving a stream of data updates from a data source;
   determining, upon a receipt of the stream, that there exists one or more read requests for the data of the first version;
   creating a second version of the data by adding the data updates to the versioned data structure, such that the second version of the data is addressable by a second address handle and the first version of the data remains addressable by the first address handle allowing for substantially simultaneous access to the first and second versions, wherein the second version of the data allows the read requests for the data of the versioned data structure to be read from the first version while the data updates are being written to the second version without read/write lock contention; and
   removing the first version of the data.

2. The method of claim 1, further comprising presenting data addressed by the first address handle in response to a read request, wherein the read request overlaps in time with a data update to data addressed by the second address handle.

3. The method of claim 1, further comprising addressing the log-structured store with file offsets contained in the versioned data structure.

4. The method of claim 1, wherein at least part of the log-structured store is memory mapped.

5. The method of claim 4, wherein at least part of the memory-mapped log-structured store is stored in virtual memory.

6. The method of claim 4, wherein the memory-mapped log-structured store is addressed with 64-bit addressing.

7. The method of claim 4, further comprising performing index lookups against the memory-mapped log-structured store, thus preventing disk head movement away from a tail of a backing file for the log-structured store.

8. The method of claim 1, further comprising clearing space in the log-structured store by re-writing live data at a write point.

9. The method of claim 8, wherein the cleared space is used to re-pack new data into related tree nodes.

10. The method of claim 1, wherein the versioned data structure is a binary tree.

11. The method of claim 10, wherein the binary tree is an AVL tree.

12. The method of claim 1, further comprising restricting the log-structured store to be bounded by physical memory.

13. The method of claim 1, wherein the versioned data structure is updated with a single data update.

14. The method of claim 1, wherein the versioned data structure is updated with a change-set comprising a plurality of data updates.

15. The method of claim 14, wherein the plurality of data updates comprises data updates corresponding to a multi-event transaction.

16. An event stream processing system for storing and accessing streaming data, the event stream processing system comprising a storage device and an update module, the storage device comprising:
   a log-structured store;
   a versioned data structure layered over the log-structured store; and
   a first version of data stored in the versioned data structure, and the update module configured to:
      receive a stream of data updates from a data source of streaming data;
      determine, upon a receipt of the stream, that there exists one or more read requests for the data of the first version;
      update the versioned data structure with the data updates to create a second version of data, the first and second versions of data separately addressable allowing for substantially simultaneous access to the first and second versions, wherein the second version of the data allows the read requests for the data of the versioned data structure to be read from the first version while the data updates are being written to the second version without read/write lock contention; and
      remove the first version of the data.

17. The event stream processing system of claim 16, wherein the versioned data structure is addressable with memory mapped file offsets.

18. The event stream processing system of claim 17, wherein the memory mapped file offsets are 64-bit offsets.

19. The event stream processing system of claim 16, further comprising a cache for holding data, the cache comprising a virtual memory subsystem of an operating system.

20. The event stream processing system of claim 16, wherein the versioned data structure is a binary tree.

21. The event stream processing system of claim 20, wherein the binary tree is an AVL tree.

22. The event stream processing system of claim 16, wherein the update module updates the versioned data structure with a change-set comprising a plurality of data updates.

23. The event stream processing system of claim 22, wherein the plurality of data updates comprises data updates corresponding to a multi-event transaction.

24. The event stream processing system of claim 16, further comprising a garbage collection module configured to re-write live data at a write point, thereby clearing space in the log-structured store.

25. The event stream processing system of claim 24, wherein the update module uses the cleared space to re-pack new data into related tree nodes.

26. The event stream processing system of claim 16, further comprising a read module configured to respond to a read request, wherein the read request overlaps in time with a data update.

27. A method for streaming data to a log-structured store in an event stream processing system, the method comprising:
creating a versioned data structure layered over the log-structured store, wherein at least part of the log-structured store is memory mapped, a first version of data in the versioned data structure having a first address handle allowing for substantially simultaneous access to the first and second versions;
receiving a stream of data updates from a data source;
determining, upon a receipt of the stream, that there exists one or more read requests for the data of the first version;
creating a second version of the data by adding the data updates to the versioned data structure, such that the second version of the data is addressable by a second address handle and the first version of the data remains addressable by the first address handle, wherein the second version of the data allows the read requests for the data of the versioned data structure to be read from the first version while the data updates are being written to the second version without read/write lock contention;
performing index lookups against the memory-mapped log-structured store, thus preventing disk head movement away from a tail of a backing file for the log-structured store; and
removing the first version of the data.

28. An event stream processing system for storing and accessing streaming data, the event stream processing system comprising a storage device and an update module, the storage device comprising:
a log-structured store;
a versioned data structure layered over the log-structured store, wherein at least part of the log-structured store is memory mapped; and
a first version of data stored in the versioned data structure having a first address handle, and the update module configured to:
receive a stream of data updates from a data source;
determine, upon a receipt of the stream, that there exists one or more read requests for the data of the first version
create a second version of the data by adding the data updates to the versioned data structure, such that the second version of the data is addressable by a second address handle and the first version of the data remains addressable by the first address handle, wherein the second version of the data allows the read requests for the data of the versioned data structure to be read from the first version while the data updates are being written to the second version without read/write lock contention;
perform index lookups against the memory-mapped log-structured store, thus preventing disk head movement away from a tail of a backing file for the log-structured store; and
remove the first version of the data.

29. A method for streaming data to a log-structured store in an event stream processing system, the method comprising:
creating a versioned data structure layered over the log-structured store, a first version of data in the versioned data structure having a first address handle;
receiving a stream of data updates from a data source;
determining, upon a receipt of the stream, that there exists one or more read requests for the data of the first version;
creating a second version of the data by copying the first version of the data and adding the data updates to the versioned data structure, such that the second version of the data is addressable by a second address handle and the first version of the data remains addressable by the first address handle allowing for substantially simultaneous access to the first and second versions, wherein the second version of the data allows the read requests for the data of the versioned data structure to be read from the first version while the data updates are being written to the second version without read/write lock contention; and
removing the first version of the data based upon a determination that there are no remaining read requests for the first version of data.

* * * * *